United States Patent Office 3,333,263
Patented July 25, 1967

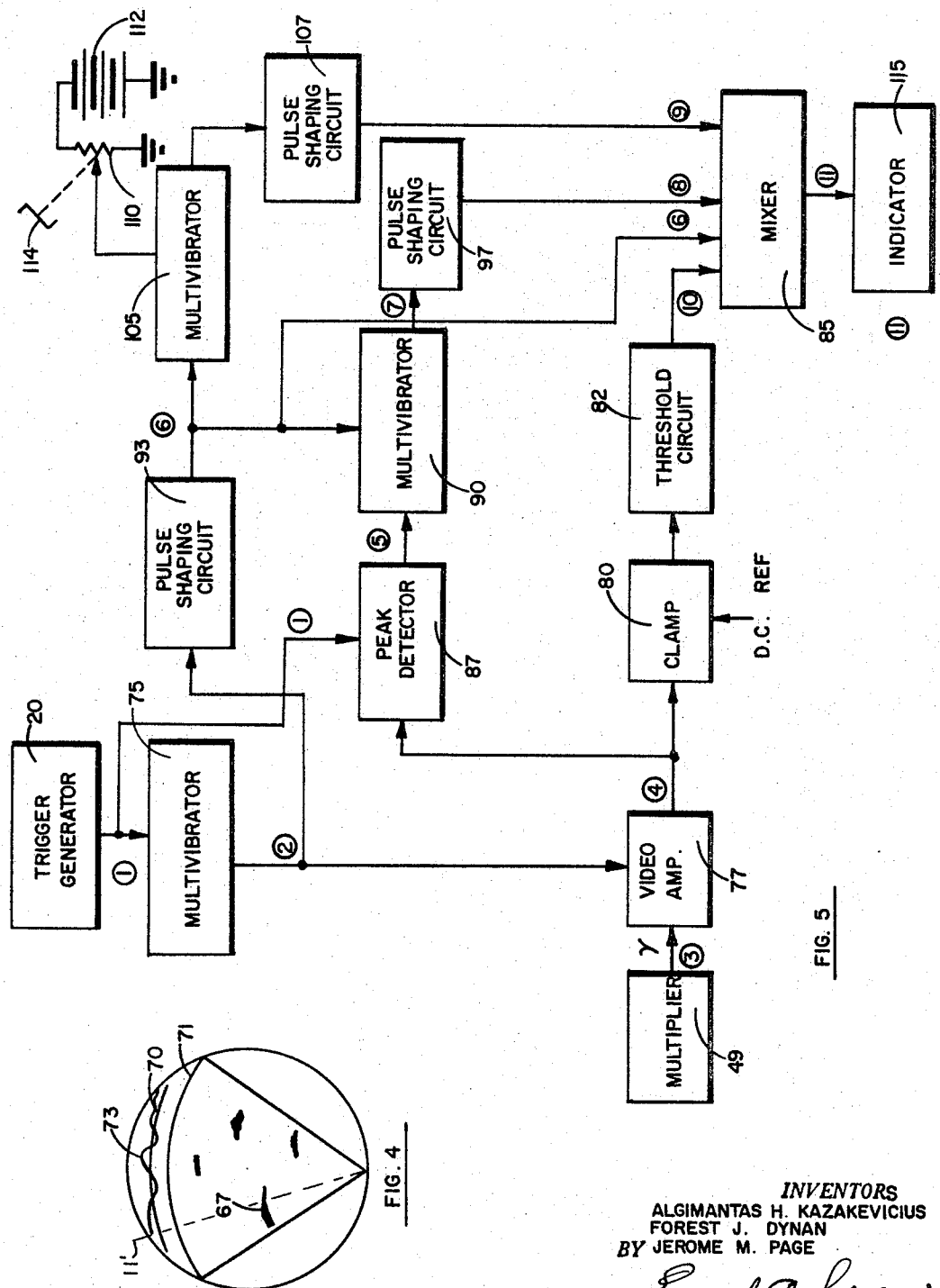

3,333,263
THREE-DIMENSIONAL DISPLAY FOR TERRAIN
AVOIDANCE RADAR
Algimantas H. Kazakevicius, Placentia, Forest J. Dynan, Whittier, and Jerome M. Page, Downey, Calif., assignors to North American Aviation, Inc.
Filed Jan. 3, 1961, Ser. No. 80,491
11 Claims. (Cl. 343—7.9)

This invention relates to a three-dimensional display for terrain avoidance radar and more particularly to a device for producing a silhouette outline of surrounding terrain in addition to the normal azimuth and range display.

The three-dimensional display of the device of this invention is a simultaneous display of range, azimuth and height information of ground targets on a single indicator. Such a display is a highly desirable feature for low altitude radar navigation. Systems now in use which display height information as well as azimuth and range information of the surrounding terrain generally display the range and azimuth information with a conventional PPI display and then either use a separate indicator for the height information or provide for alternative selection of the normal PPI display or the height information display. Such a transition from one type of display to another or the use of two separate indicators is distractive to the operator and often a strain on his eyes. In addition, such displays often do not provide as graphic an indication of the surrounding terrain as could be desired. Further, the mechanization necessary to obtain height information video for display is usually complex.

The device of this invention overcomes these shortcomings by providing a simultaneous display of range, azimuth, and height information on a single PPI indicator. The surrounding terrain is displayed in the form of a silhouette outline indicative of the relative angles subtended by objects in the line of sight which is presented at the end of the PPI sweep trace.

The device of this invention utilizes the angular warning signal or the relative height warning signal generated in a terrain avoidance radar. This warning signal, which is indicative of the angle subtended by surrounding objects of the terrain above and below a predetermined clearance surface which may be a plane is peak detected to provide the maximum warning signal output during a first time interval corresponding to each PPI range sweep. Gate means, which may include a multivibrator synchronized with the radar trigger generator, are used to permit the passage of normal video for range and azimuth display on the PPI screen only during the first time interval corresponding to the predetermined PPI range sweep. The peak detected warning signal output is stored during this first time interval. At the end of this first time interval, the trailing edge of the gate signal is used to key a second multivibrator. The time period of this second multivibrator is controlled by the stored peak detected output. The trailing edge of the multivibrator output is differentiated and fed to the indicator. This differentiated pulse is produced at the end of a second time interval the length of which is a function of the magnitude of the stored output of the peak detector.

In this manner, for each PPI range sweep, a signal will be generated to produce a brightness dot at a distance from the end of the range sweep corresponding to the magnitude of the output of the peak detector. The output of the peak detector in turn is a function of the maximum amplitude of the warning signal during each PPI range sweep, which is indicative of the maximum height of any objects in the terrain at each azimuth. For a complete PPI azimuth scan then, a series of dots indicative of the contour of the surrounding terrain will appear at the end of the sweep trace. These numerous dots will appear to the eye as a line representing a silhouette outline of the terrain contour.

The device of this invention can readily be incorporated into any terrain avoidance radar which generates a warning signal indicative of the relative height of surrounding terrain. No significant modifications to the existing radar are required and a minimum amount of circuitry is necessary to achieve the desired terrain contour display. The circuitry used is relatively simple and is neither critical nor expensive in nature.

It is therefore an object of this invention to provide a simple yet effective means for producing a three-dimensional display in a terrain avoidance radar.

It is a further object of this invention to utilize the warning signal produced in a terrain avoidance radar to achieve a three-dimensional display.

It is still a further object of this invention to improve the display of information in a terrain avoidance radar.

It is still another object of this invention to provide means for readily adding a three-dimensional display to existing terrain avoidance radar systems.

It is yet another object of this invention to provide a display in silhouette outline form of surrounding terrain simultaneously with the display of normal range and azimuth information.

Other objects of this invention will become apparent from the following description taken in connection with the accompanying drawings in which FIG. 1 illustrates the geometry of the problem solved in a terrain avoidance radar system;

FIG. 2 is a functional block diagram illustrating the mechanization used in a typical terrain avoidance radar system in solving the problem illustrated in FIG. 1;

FIG. 3 pictorially illustrates the general nature of the display generated in the device of the invention;

FIG. 4 illustrates a typical PPI display of the device of the invention;

FIG. 5 is a block diagram of a preferred embodiment of the device of the invention;

Figure 6:
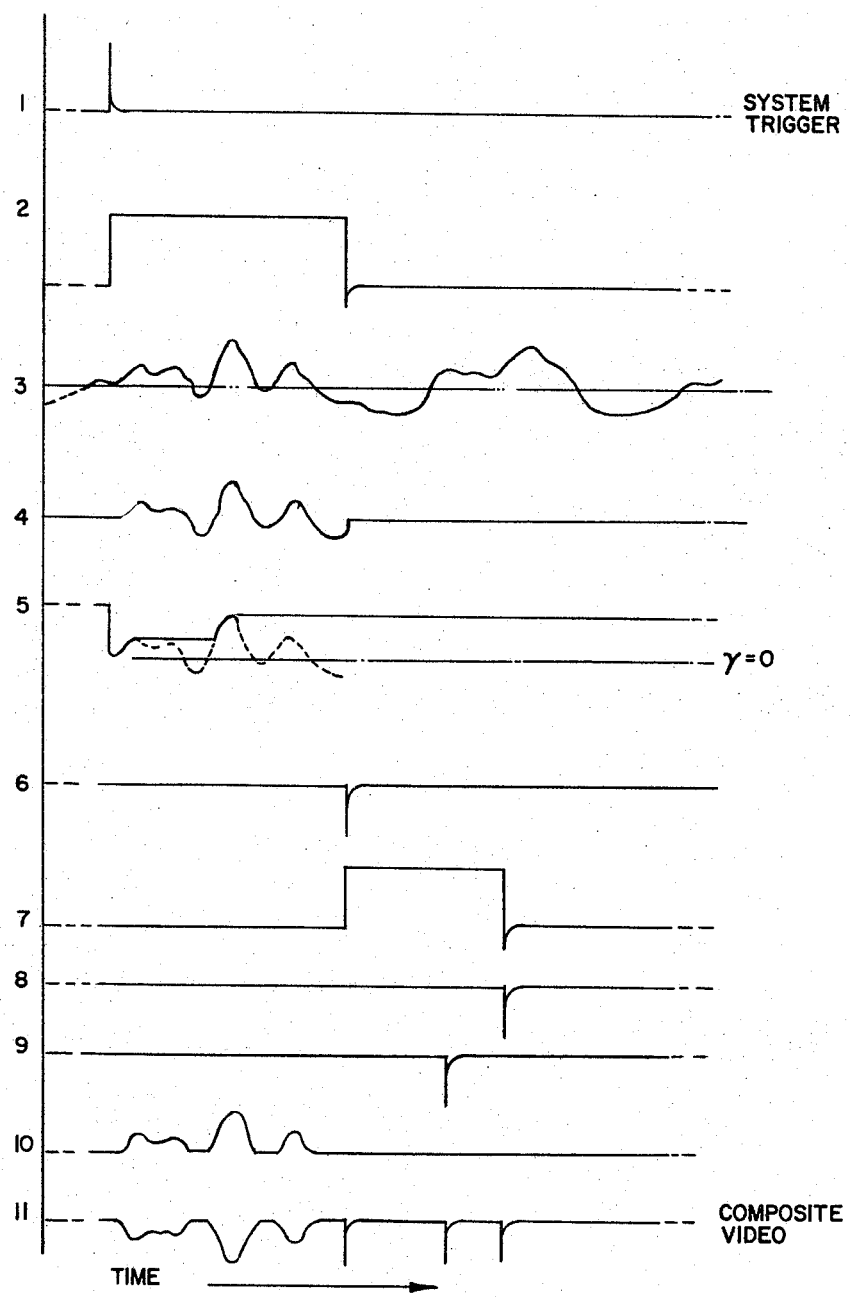

And, FIG. 6 is a series of waveforms illustrating the operation of the embodiment of the device of the invention illustrated in FIG. 5.

Terrain avoidance radar systems in which the device of this invention may be incorporated are described in the following co-pending applications all of which are assigned to North American Aviation, Inc., the assignee of this application: Application Ser. No. 830,675, filed July 30, 1959, now Patent No. 3,165,740, entitled, "Terrain Clearance Radar," William E. Stoney, inventor; application Ser. No. 698,893, filed Nov. 20, 1957, now Patent No. 3,251,060, entitled "Profiloscope," W. L. Mitchell, inventor; application Ser. No. 704,206, entitled, "Ground Clearance Warning System," filed Dec. 20, 1957, M. R. Burns et al., inventors, and application Ser. No. 33,860, filed June 30, 1960, R. O. Case, Jr., et al., inventors. All of these systems utilize monopulse radar systems such as that described in Patent No. 2,956,275, issued Oct. 11, 1960, R. M. Ashby, inventor.

A monopulse radar system is characterized by the ability to produce from a single pulse of radar information an output signal indicative of the deviation of a target from the boresight of the antenna. In the monopulse system described in Patent No. 2,956,275, the signals received by the antenna are additively and subtractively combined and fed to a dual channel receiving system which provides a sum signal $E_s$ according to the additively combined energy and a difference or error signal $E_d$ according to the subtractively combined energy. The angle $\beta$ is defined as the angle the target subtends with the boresight axis of the antenna in the elevation plane.

It is determined by the relation between the sum signal and the difference signal in the form $E_d = K_1 \beta E_s$ where $K_1$ is a constant of proportionality. With instantaneous automatic gain control incorporated in the system, the sum signal $E_s$ is a constant so that $E_d = K_2 \beta$. Therefore, in a monopulse radar system such as that described in the aforementioned Ashby patent, the difference signal output is a direct measure of the angle $\beta$, which the target subtends in elevation relative to the boresight axis of the antenna.

Figure 1:
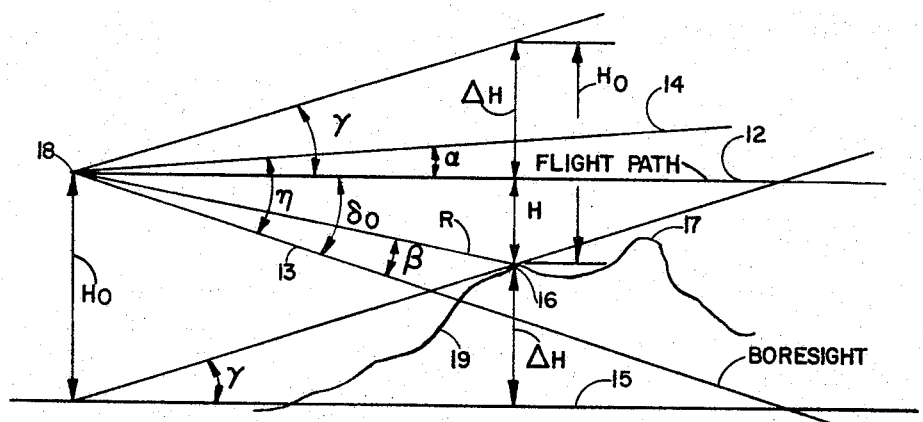

Referring to FIG. 1, the nature of the terrain avoidance problem is illustrated. With a low flying aircraft at point 18 proceeding along a flight path 12 above ground terrain 19, the aircraft's longitudinal reference axis 14 which may correspond to the aircraft roll axis is displaced from the flight path 12 by an angle of attack $\alpha$. The boresight axis 13 of the monopulse radar antenna mounted in the aircraft is depressed with respect to the aircraft longitudinal axis 14 through an angle $\eta$, such that it will intercept a clearance plane 15 at a known or predetermined range $R_0$. The clearance plane 15 is located at a predetermined distance $H_0$ below the flight path 12 and is parallel to the horizontal plane in which the flight path is located.

It can be seen from the geometry of FIG. 1 that the instantaneous perpendicular distance H from the flight path 12 to an obstacle such as peak 16 at slant range R from the radar antenna can be computed. The slant range R is proportional to the elapsed time of the video return, the angle $\beta$ is determined by the difference or error signal generated in the monopulse radar system and the angle (delta) $\delta_0$ is the depression angle of the radar antenna boresight below the flight path which can be readily computed. Since low altitude flight is assumed, small angle approximations are appropriate, i.e., it can be assumed that the sines and tangents of the various angles are equal to the angles themselves as expressed in radians. $\beta$ is treated as a negative quantity where the target 16 is (as is the case in FIG. 1) above the boresight axis 13 of the antenna and a positive quantity where the target is below the boresight axis. It can be seen from FIG. 1 that $\eta - \alpha = \delta_0$. Therefore (treating $\beta$ as a negative quantity in the computation for the case illustrated in FIG. 1)

$$H = R(\delta_0 + \beta) \qquad (1)$$

The magnitude of any protrusion of the terrain through the clearance plane results in a $\Delta H$ which is the difference between the measured altitude, H, and the desired clearance plane $H_0$. In equation form then, $$\Delta H = H_0 - H \qquad (2)$$

and by substituting Equation 1 in Equation 2

$$\Delta H = H_0 - R(\delta_0 + \beta) \qquad (3)$$

The increase in flight path angle $\gamma$ (assuming small angular changes) from the clearance plane directly beneath the aircraft necessary to clear the obstacle by the desired amount, $H_0$, can be seen from FIG. 1 to be as follows:

$$\gamma = \frac{H_0}{R} - (\delta_0 + \beta) \qquad (4)$$

The angle $\gamma$ can be either positive or negative and represents the angle which an object of terrain subtends above or below the clearance plane.

The value of $\beta$ is derived from monopulse operation as previously explained and can be expressed as follows:

$$\beta = K E_d / E_s \qquad (5)$$

Substituting this expression into Equation 4 we get $$\gamma = \frac{H_0}{R} - \left( \delta_0 + \frac{K E_d}{E_s} \right) \qquad (6)$$

Figure 2:
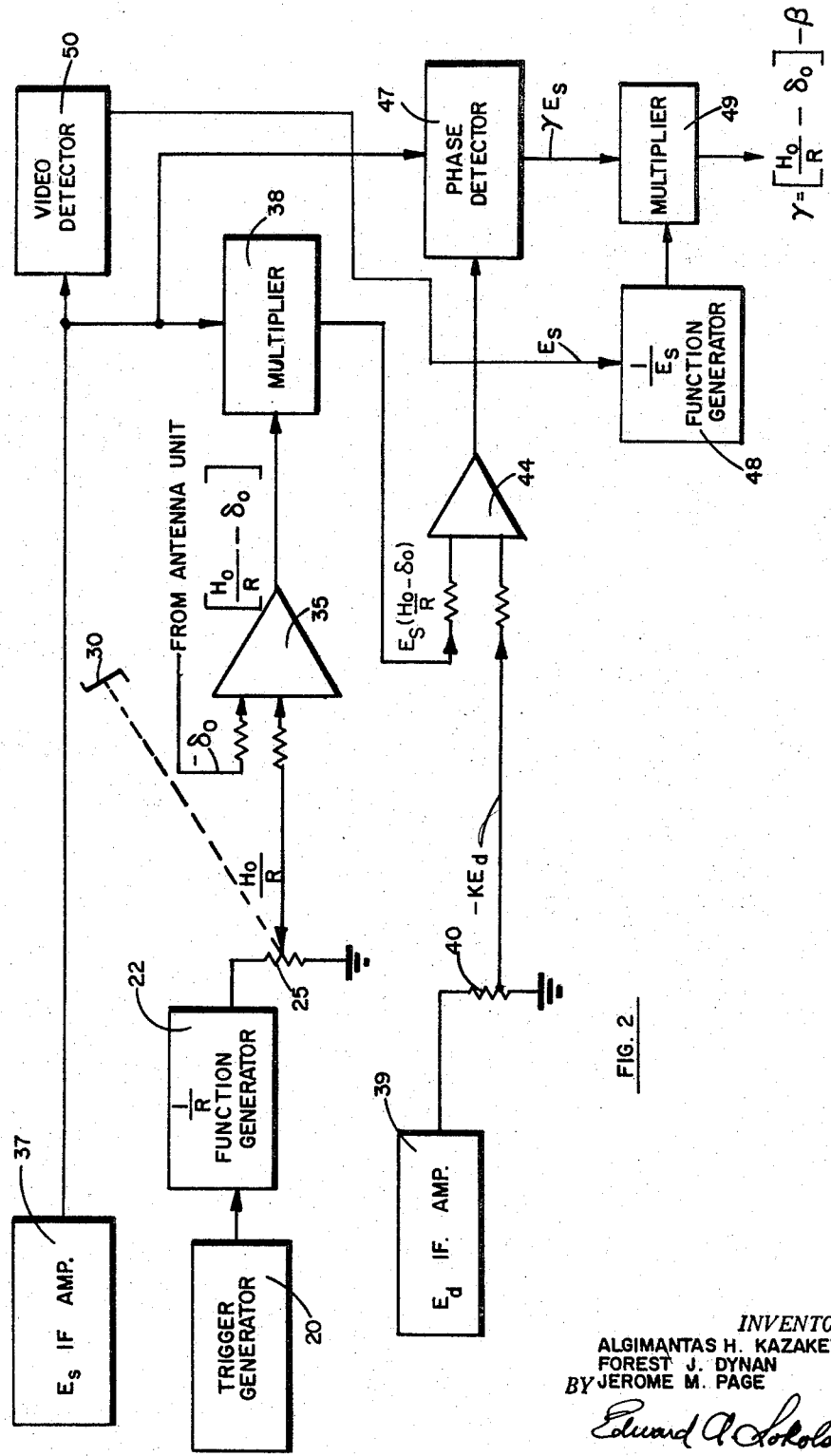

Referring now to FIG. 2, the means for mechanizing the terrain avoidance Equation 6 is illustrated. It is to be noted that this is just one of many methods that may be used for deriving the warning signal $\gamma$.

The output of trigger generator 20, which is the radar system trigger, is fed to function generator 22 in which it initiates the generation of an exponential signal which is proportional to $1/R$. Function generator 22 may, for example, comprise a phantastron for generating a negative going square wave in response to the trigger signal from trigger generator 20 and a passive R-C network in which the negative going square wave is shaped in accordance with $1/R$. Such a function generator is shown in the aforementioned pending application Ser. No. 704,206. The output of function generator 22 is fed across potentiometer 25. Potentiometer 25 is positioned by means of knob 30 to represent the predetermined desired altitude clearance, $H_0$. The signal at the arm of potentiometer 25 is a proportion of the output of function generator 22 which is determined by the setting of the arm of potentiometer 25. This, as indicated, is $H_0/R$. A signal indicative of and of opposite sense as $\delta_0$, which is the angle between the radar antenna boresight and the flight path of the aircraft is fed from the antenna unit (not shown) to summing amplifier 35. This (minus delta) $-\delta_0$ signal is generated from angle of attack and antenna position informaton by techniques well known in the art.

The $H_0/R$ signal from potentiometer 25 and the (minus delta) $-\delta_0$ signal from the antenna unit (not shown) are fed to summing amplifier 35 where they are summed to produce $$\frac{H_0}{R} - \delta_0$$

The output of monopulse sum channel IF amplifier 37 is fed to multiplier 38 where it is multiplied with the output of summing amplifier 35. The output $-E_d$, of the difference channel IF amplifier 39 is multiplied by a constant by means of potentiometer 40 and then fed to summing amplifier 44 where it is summed from the output of multiplier 38. The output of summing amplifier 44 therefore is, $$E_s \left( \frac{H_0}{R} - \delta_0 \right) - K E_d = \gamma E_s \qquad (7)$$

The output of summing amplifier 44 is fed to phase detector 47, for which a reference signal is fed from sum channel IF amplifier 37. The output of sum channel IF amplifier 37 is detected in video detector 50. The output of video detector 50 is fed to function generator 48 where a signal proportional to $1/E_s$ is generated. Function generator 48 may, for example, comprise a passive R-C network. The outputs of function generator 48 and phase detector 47 are multiplied in multiplier 49. The output of multiplier 49 is the warning signal $\gamma$ which is equal to $$\left( \frac{H_0}{R} - \delta_0 - \frac{K E_d}{E_s} \right)$$

$\beta$ is by definition the ratio between the error channel signal $E_d$ and the sum channel $E_s$ or $K E_d / E_s$. Therefore, the warning signal output from multiplier 49 can be written as follows:

$$\gamma = \left( \frac{H_0}{R} - \delta_0 \right) - \beta \qquad (8)$$

It is to be noted that $\beta$ is deemed negative for angles subtended above the antenna boresight axes and positive for angles subtended below the antenna boresight axes.

Figure 3:
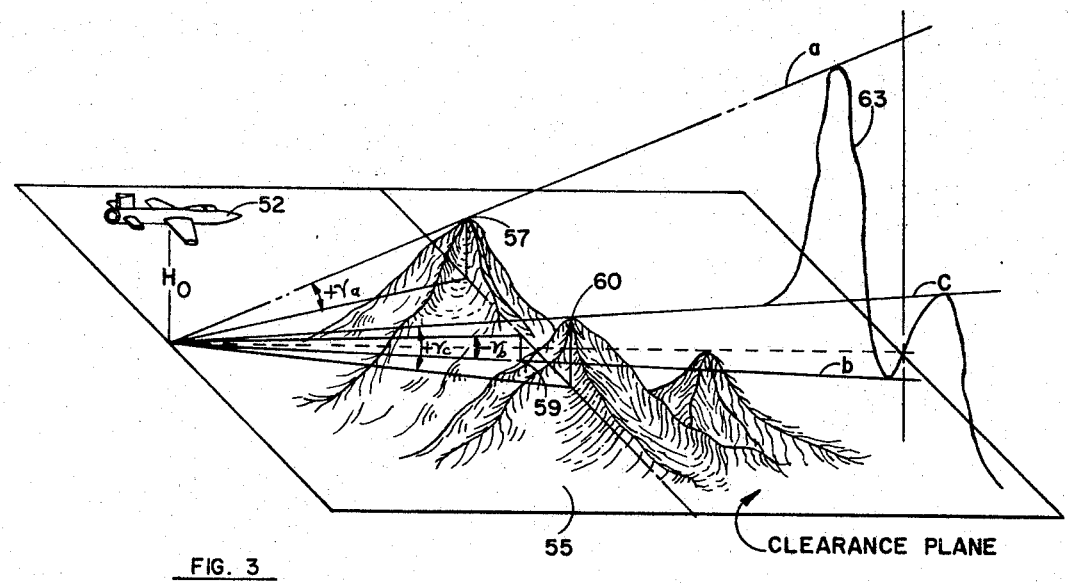

Referring now to FIGS. 3 and 4, the general manner in which the warning signal $\gamma$ is utilized in the device of the invention is illustrated. For an aircraft 52 flying with an altitude clearance setting $H_0$ above the clearance plane 55 a warning signal $+\gamma_a$ as indicated in FIG. 3 will be generated at azimuth $a$, due to peak 57, a warning signal $-\gamma_b$ will be generated at azimuth $b$, due to the depression at point 59 and, a warning signal $+\gamma_c$ will be generated at azimuth $c$, due to peak 60. The display which will appear on the PPI scope will include all the maximum points in the terrain between azimuths $a$ and $c$ as well as those before and beyond these azimuths and will be a silhouetted outline of the terrain as indicated by line 63.

Referring to FIG. 4, a typical PPI presentation of the device of the invention is shown. PPI video representing objects above the clearance plane are indicated by patches 67. The clearance plane itself is indicated by line 70 and the silhouette outline of the terrain both above and below the clearance plane is indicated by line 73. The intersection of azimuth line 11' with the transverse terrain profile curve 73 above the reference or clearance line 70 corresponds with the terrain obstacle 67 appearing at the same azimuth on the PPI portion of the display indicator, while the appearance of the curve 73 below the vertical clearance reference line 70 at certain other azimuth directions corresponds with the absence or non-occurrence of terrain obstacles in the PPI portion of the display for such azimuth directions. Line 71 indicates the end of the PPI range sweep. The pilot thus has a normal terrain avoidance PPI display indicating those objects which are above the clearance plane as well as a silhouetted outline of objects both above and below the clearance plane. He thereby has an indication of the exact features of the terrain before him at all times. This greatly facilitates the flying of the aircraft to avoid obstacles in that the pilot can watch the obstacles indicated in the silhouette display fall below the clearance plane as he noses the aircraft upwards. He can also be assured that the lack of PPI signals on his scope actually indicates the avoidance of obstacles in his flight path rather than perhaps being actually due to a malfunction of the radar.

Referring now to FIGS. 5 and 6, a block diagram of a preferred embodiment of the device of the invention and illustrations of the wave shapes at various points in FIG. 5 are respectively illustrated. A trigger signal 1 is fed from the radar trigger generator 20 to multivibrator 75. This trigger signal is a sharp positive going pulse as illustrated at 1 in FIG. 6. Multivibrator 75 is a monostable multivibrator with its time period adjusted to provide a predetermined PPI range sweep. The output of monostable multivibrator 75 is a square wave as indicated in FIG. 6 at 2. The output of multivibrator 75 is used to gate video amplifier 77 into conduction. Video amplifier 77 is normally at cutoff and will only conduct when gated by multivibrator 75. The output 3 of multiplier 49 which is the γ warning signal is fed through video amplifier 77 only during the period that this amplifier is gated to conduction by the output of multivibrator 75. The output of video amplifier 77 is indicated at 4 in FIG. 6. The output of video amplifier 77 is clamped to an appropriate D-C reference level by means of clamp 80 and fed to threshold circuit 82 which is biased so that only the positive going components which represent positive values of γ are fed through to video mixer 85. The output of threshold circuit 82 is indicated at 10 in FIG. 6.

The output of video amplifier 77 is also fed to peak detector 87 where the peak value of all of the signals fed thereto during each PPI range sweep are stored. This stored signal is indicated at 5 in FIG. 6. The stored signal is retained following each PPI range sweep until the arrival of the trigger pulse (indicated at 1 in FIG. 6) for the succeeding range sweep. This trigger pulse effectively discharges the signal stored in the peak detector and sets a predetermined reference level so that the detector output accurately represents the most positive or least negative γ output during each separate sweep and has no residual signal developed during previous sweeps.

The D-C output of peak detector 87 is fed to monostable multivibrator 90 where it is used to control the time period of conduction of this multivibrator. The output of multivibrator 75 is fed to pulse shaping circuit 93 which differentiates the signal fed thereto and clips off the positive going differentiated leading edge of the square wave. The differentiated trailing edge of the square wave from multivibrator 75 is indicated at 6 in FIG. 6 and is fed as a trigger signal to monostable multivibrator 90.

The output of monostable multivibrator 90 which as indicated at 7 in FIG. 6 is a square wave synchronized with the output 6 of pulse shaping circuit 93 and having a time period determined by the amplitude of the output 5 of peak detector 87. The output 7 of monostable multivibrator 90 is fed to pulse shaping circuit 97 which differentiates the signal, clips the positive going signal produced by the leading edge of the square wave and has an output 8 as indicated in FIG. 6 which is a negative going pulse coinciding with the trailing edge of the output 7 of multivibrator 90. The output 8 of pulse shaping circuit 97 is fed to video mixer 85.

Monostable multivibrator 105 is triggered by the differentiated pulse (6 in FIG. 6) which coincides with the trailing edge of the output of multivibrator 75. The time period of this multivibrator is determined by the voltage fed thereto from potentiometer 110. Potentiometer 110 has a bias voltage supplied across it from D-C source 112. The movable arm of potentiometer 110 is mechanically coupled to knob 114 which is a calibration setting knob and is used to establish a reference line indicative of zero γ angle. The output of multivibrator 105 is fed to pulse shaping circuit 107 where the leading and trailing edges are differentiated and the positive going pulse produced by the leading edge is clipped. The output of pulse shaping circuit 107, indicated at 9 in FIG. 6, is a negative going pulse which is fed to video mixer 85. This pulse indicates the clearance plane reference and is a direct function of the setting of the arm of potentiometer 110 by knob 114. The differentiated trailing edge of the output of multivibrator 75 is fed from pulse shaping circuit 93 to video mixer 85. This signal, which is shown at 6 in FIG. 6, is a negative going pulse indicative of the end of the PPI range sweep. The trace produced by the signals indicated at 9 and 6 in FIG. 6 are indicated in FIG. 4 by lines 70 and 71, respectively. Line 70 indicates the location of the clearance plane relative to the silhouette outline display, while line 71 indicates the end of the PPI range sweep.

The output of video mixer 85, which is indicated at 11 in FIG. 6, is fed to the PPI indicator 115. It can be seen by reference to line 11 in FIG. 6 that this composite video signal includes video indicative of targets above the clearance plane during a first interval of time corresponding to the PPI range sweep. It also includes a signal indicative of the end of the PPI range sweep, a signal indicative of the clearance plane reference set by means of knob 114, and a signal indicative of the maximum angle subtended by any target encountered during each PPI range sweep. The means for generating a range and azimuth sweep for a PPI presentation with a single beam cathode ray tube are well-known to those skilled in the art, and such means does not constitute an aspect of the invention. Accordingly, indicator 115 is shown in block form only.

The device of this invention thus provides a simple yet highly effective means for providing a silhouette outline display of the terrain scanned by a terrain avoidance radar. This display can be added to such a radar with a minimum amount of modification to existing circuitry. The display is presented subsequent to the presentation of PPI range information where it provides a graphic display of the surrounding terrain.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an azimuth-scanning terrain avoidance radar having a warning signal output indicative of the subtended angle of terrain above and below a predetermined clearance surface as a function of azimuth and range, said radar having a trigger generator for synchronization, a three-dimensional display device comprising an azimuth and distance indicator, means responsive to said trigger generator for coupling said warning signal output to said indicator during a predetermined first time interval for each azimuth displayed upon said indicator, and means for generating a pulse output at the end of a second time interval following said first time interval in response to the maximum warning signal output during said first time interval for said displayed azimuth, the length of said second time interval being a function of the magnitude of the maximum warning signal output during said first time interval, the output of said pulse generating means being fed to said indicator.

2. The device as recited in claim 1 and additionally comprising means for generating a signal during a time period following said first time interval indicative of the clearance surface, said clearance surface signal being fed to said indicator.

3. In a terrain avoidance radar having a warning signal output indicative of the subtended angle of terrain above and below a predetermined clearance surface as a function of azimuth and range, said radar having a trigger generator for synchronization, a three-dimensional display device comprising an azimuth and radial position, indicator, means responsive to said trigger generator for coupling said warning signal output to said indicator during a predetermined first time interval following the time of arrival of a trigger pulse from said trigger generator, means for storing a signal in accordance with the maximum warning signal output during said first time interval, and means responsive to the output of said storing means and said means responsive to said trigger generator for generating a pulse output at the end of a second time interval following said first time interval, the length of said second time interval being a function of the magnitude of the output of said storing means, the output of said pulse generating means being fed to said indicator.

4. The device as recited in claim 3 wherein said means responsive to said trigger generator for coupling said warning signal output to said indicator comprises a multivibrator and a video amplifier, the output of said multivibrator being used to gate said video amplifier, said warning signal output being fed to the input of said video amplifier, the output of said video amplifier being simultaneously fed to said indicator and said storing means.

5. The device as recited in claim 4 wherein said storing means comprises a peak detector, the output of said trigger generator being fed to said peak detector.

6. In a terrain avoidance radar having a warning signal output indicative of terrain above and below a predetermined clearance plane, said radar having means for adjusting the clearance plane and being synchronized with the output of a trigger generator, a device for obtaining a three-dimensional display comprising means responsive to the output of said trigger generator for generating a gating signal of predetermined time duration, a video amplifier, said warning signal output being fed to said video amplifier, said gating signal being fed to control the conduction period of said video amplifier, peak detector means for storing a signal indicative of the peak output of said video amplifier during the periods between said trigger pulses, a monostable multivibrator, said multivibrator being keyed in response to the trailing edge of said gating signal, the output of said peak detector being fed to said multivibrator to control the time period thereof, pulse shaping means for producing a pulse signal in response to the trailing edge of said multivibrator output, and an indicator connected to receive the outputs of said video amplifier and said pulse shaping means.

7. The device as recited in claim 6 and additionally comprising a second monostable multivibrator keyed in response to the trailing edge of said gating signal, means for adjusting the time period of said second multivibrator, second pulse shaping means for producing a pulse in response to the trailing edge of said second multivibrator output, said second multivibrator output being fed to indicator.

8. In a terrain avoidance radar having a warning signal output indicative of terrain above and below a predetermined clearance plane, said radar having means for setting the clearance plane and being synchronized with the output of a trigger generator, a device for obtaining a three-dimensional display comprising a first monostable multivibrator responsive to the output of said trigger generator, said first multivibrator being adjusted to generate a gating signal of predetermined time duration, a video amplifier, said warning signal output being fed to said video amplifier, said gating signal being fed to control the conduction period of said video amplifier, peak detector means connected to receive the output of said video amplifier for storing a signal indicative of the peak output of said video amplifier during the periods between said trigger pulses, the output of said trigger generator being fed to said peak detector means to discharge the output thereof, a second monostable multivibrator, said second multivibrator being keyed in response to the trailing edge of said gating signal, the output of said peak detector being fed to said second multivibrator to control the time period thereof, first pulse shaping means for producing a pulse signal in response to the trailing edge of said second multivibrator output, a third monostable multivibrator, said third multivibrator being keyed in response to the trailing edge of said gating signal, means for adjusting the time period of said third multivibrator, second pulse shaping means for producing a pulse signal in response to the trailing edge of said third multivibrator output, and an indicator connected to receive the outputs of said video amplifier and said first and second pulse shaping means.

9. The device as recited in claim 8 and additionally comprising third pulse shaping means responsive to the output of said first multivibrator, for producing a pulse in accordance with the trailing edge of the output of said first multivibrator, the output of said pulse shaping means being simultaneously fed to said second and third multivibrators and said indicator.

10. The device as recited in claim 8 and additionally comprising means interposed between said video amplifier and said indicator for removing negative going signals.

11. In a radar system, means providing a signal representing the angle subtended by terrain above and below a predetermined clearance surface, means for peak detecting said signal, and means responsive to the output of said peak detector for providing a silhouette outline display of the terrain.

References Cited

UNITED STATES PATENTS

| | | | |
|---|---|---|---|
| 2,508,358 | 5/1950 | Ayres | 343—7.9 |
| 2,574,853 | 11/1951 | Ward | 244—77 |
| 2,630,283 | 3/1953 | Hanson | 244—77 |
| 2,951,244 | 8/1960 | Donahue | 343—7.9 |
| 2,965,894 | 12/1960 | Sweeney | 343—7 |
| 3,086,200 | 4/1963 | Altermann | 343—112.4 |

RODNEY D. BENNETT, *Primary Examiner.*

CHESTER L. JUSTUS, *Examiner.*

D. MEXIC, R. E. KLEIN, P. M. HINDERSTEIN, R. E. BERGER, *Assistant Examiners.*